UNITED STATES PATENT OFFICE.

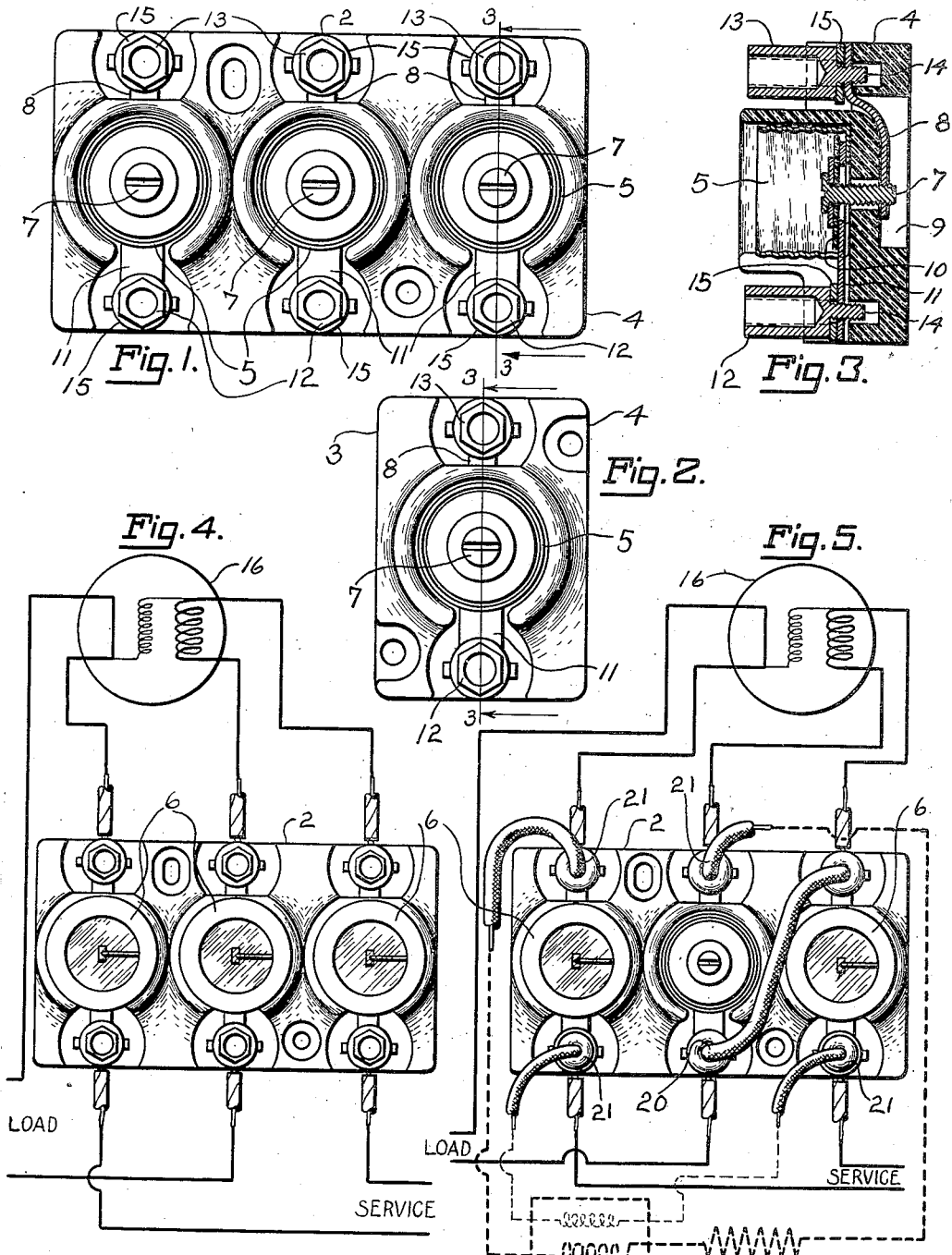

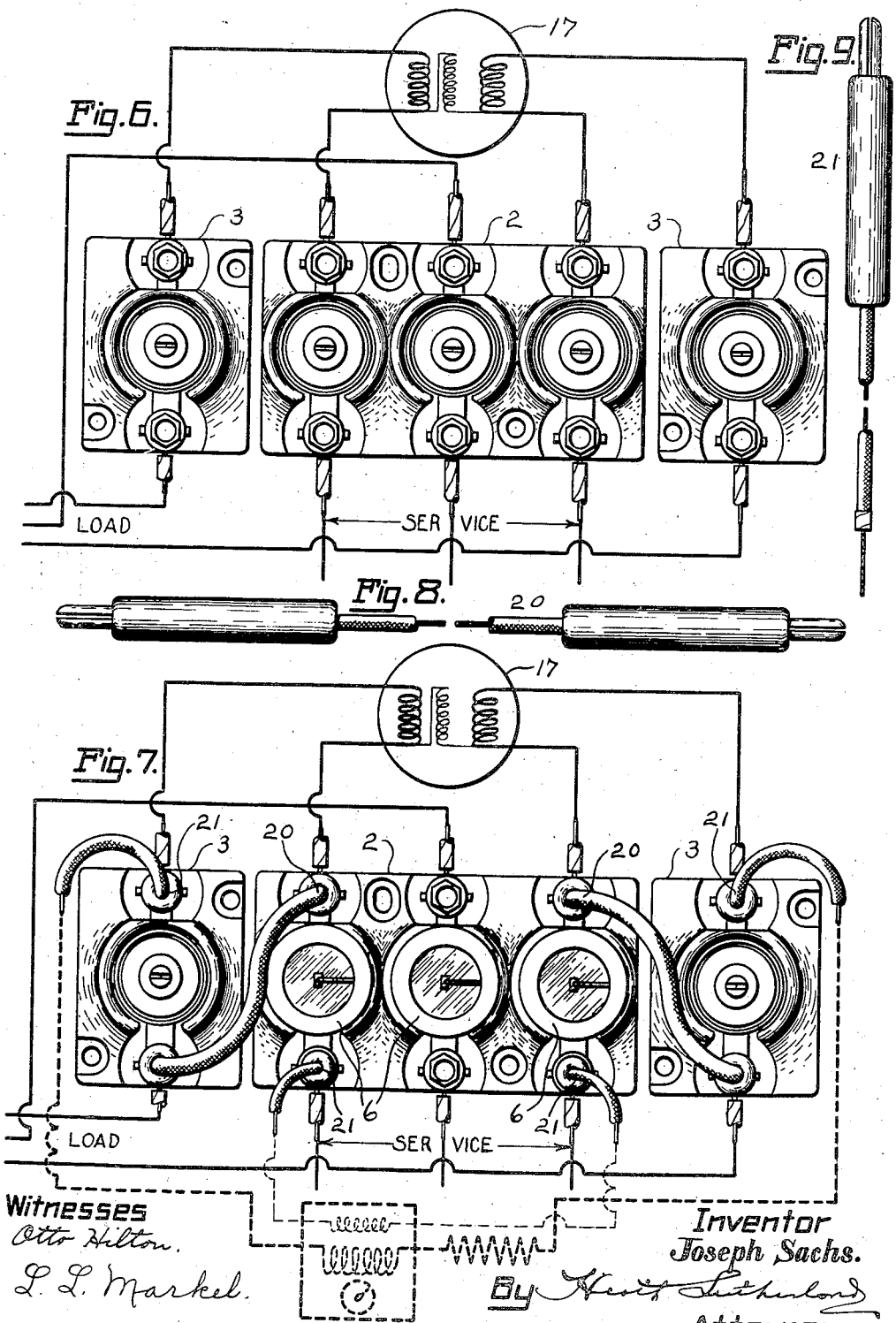

JOSEPH SACHS, OF HARTFORD, CONNECTICUT.

METER-TESTING APPLIANCE.

1,194,883.  Specification of Letters Patent.  Patented Aug. 15, 1916.

Application filed October 9, 1915. Serial No. 54,993.

*To all whom it may concern:*

Be it known that I, JOSEPH SACHS, a citizen of the United States, residing at Hartford, in the county of Hartford and State of Connecticut, have invented certain new and useful Improvements in Meter-Testing Appliances, of which the following is a specification.

This invention relates to what I shall for convenience term a meter testing appliance, the object of the invention being to provide an article of this character adapted for connection with any suitable meter and which is of such nature that the same parts, adapted to receive between them a fuse, whereby the appliance functions as a cut out, are also utilized for testing purposes.

In the drawings accompanying and forming part of the present specification I have shown two slightly different forms of embodiment of the invention which will be hereinafter more fully set forth. I do not limit myself to this disclosure; I may depart therefrom in several respects within the scope of the claims. For instance, while I have shown a plug fuse which is highly efficient, I might employ any other kind of fuse.

Referring to said drawings: Figure 1 is a plan view of one form of testing appliance, the several plugs being shown removed. Fig. 2 is a similar view of the other form of testing appliance, the plug also being removed. Fig. 3 is a transverse section on the line 3—3 of Figs. 1 and 2 looking in the direction of the arrows, also with the plug removed. Fig. 4 is a view of the appliance of Fig. 1 connected to a single coil meter, two wire system, the connections being the normal ones and all the plugs being inserted. Fig. 5 is a similar view, the parts being arranged for testing. Fig. 6 is a plan view of two of the appliances associated together and connected up with a two coil meter, three wire system, the several plugs being removed and the connections being the normal ones. Fig. 7 is a like view showing the appliances connected up for testing with the necessary plugs in place. Fig. 8 is a detail view of a by-pass testing element, and, Fig. 9 is a like view of a main testing element.

Like characters refer to like parts throughout the several figures.

A testing appliance involving my invention has at least one pair of coöperating contacts and a connector preferably in the form of a fuse, to make and break electrical connection between said contacts, one or both of said contacts being provided with means constantly conditioned for the connection therewith of suitable testing means. The connector is generally a fuse and may be any one of several different kinds, a plug fuse as will hereinafter appear, serving satisfactorily in this particular. While as may be inferred, a connector in the form of a fuse is necessary when the appliance is to function as a cut out, there may be cases where the connector may be plain or non-fused. As I have already observed a testing appliance comprising the invention has at least two coöperating contacts. There are forms of the appliance where there are a larger number. The invention, therefore, does not necessarily concern the number of pairs of contacts. I have herein shown two of the many forms which the testing appliance may take. In one of these forms there is but a single pair of contacts and in the other there are three pairs of contacts. There may be instances where two or more of these appliances can be associated together, and when thus associated or when separately used, they present a meter testing and connection device. When it is necessary for testing or cut out purposes to use several pairs of contacts, these may be mounted on one or more bases as desired.

In Fig. 1 I have shown one form of testing appliance denoted in a general way by 2, and in Fig. 2 the other form 3. The two forms differ from each other only in the number of contacts. The testing appliance shown in Fig. 1 for instance, has three pairs of coöperating contacts, while that illustrated in Fig. 2 has but a single pair. Either of these appliances serving both the functions of a cut out and meter testing appliance, presents an entity. In Figs. 4 and 5 I have shown the appliance 2 in conjunction with a two wire single coil meter on a two wire system, and in normal and testing relation respectively. In Figs. 6 and 7 I have shown a testing appliance as 2 and two testing appliances as 3 operatively associated and illustrated respectively in normal and testing relations associated with a three wire, two coil meter on a three wire system. In Figs. 4 and 5 the testing appliance therein shown constitutes a fully operative meter testing and connection device, while in Figs. 6 and 7 the complete article therein shown is in the nature of a sectional device.

The two appliances shown separated from everything else and without their connectors in Figs. 1 and 2 are identical in construction, differing only in the number of contacts carried. While the device in Figs. 6 and 7 is of sectional type, this is not an essential matter, for the five pairs of contacts may be carried on a single base or in lieu of this I might utilize five of the appliances shown in Fig. 2 in the installation represented in Figs. 6 and 7, or I might use three of the appliances as 3 in the installation shown in Figs. 4 and 5. The number of contacts and the character of base whether of integral or sectional nature, are not of elemental consideration.

Proceeding further with the detailed description of the two appliances, each comprises a base as 4 of insulating material such as porcelain. I will describe merely one pair of contacts and associated testing and connecting means, this applying precisely to the others. Referring for example to Fig. 3, the insulating base 4 carries a shell 5 shown as interiorly threaded and which may as in the present case, receive a plug shown as a fuse plug 6. This shell 5 constitutes one of a pair of coöperating contacts. The other contact of the pair as shown, consists of the screw 7 by which, in the present case, the shell 5 is held to the base 4. When the plug 6 bottoms in the shell 5 it electrically connects across said contact or shell and said contact or holding down screw 7. This plug serving as a fuse also acts as one convenient type of bodily mountable and dismountable connector. The screw 7 extends through the bottom of the contact or shell 5 and through an opening or perforation in the base 4 and is threaded into the strip 8 disposed in a groove 9 in the under side of the base 4. Said strip 8 is a continuation, prolongation or part of the contact 7, being bent at its outer end over the upper surface of the base 4. The contact or screw 7 holds down the insulating washer 10 which rests on the strip 11. This strip 11 which is in electrical connection with the contact or shell 5, extends therefrom and overlies the upper surface of the base 4, thus constituting a continuation of the contact 5. The disk 10, of fiber or other suitable material, acts as a convenient means to insulate the two contacts 5 and 7.

While it is possible in some cases that only one contact of each pair may be equipped with means constantly conditioned for receiving testing instrumentalities, of whatever kind the same may be, I prefer that both contacts should be so equipped. Said means in the present case, is of such nature that one or more testing devices can be removably connected, at will, to the testing appliance, by reason of which a test can be made without disturbing in any respect whatsoever an installation and without affecting the supply of current to the customer.

In the organization herein shown and described the terminals of the testing devices consist of plugs, and in this event the means associated with the contacts, for testing purposes, are preferably in the form of sockets. This is advantageous, but not always necessary. The receiving means for the testing means whether in the form of sockets or otherwise, preferably subserve an additional function, namely for connecting the conductors to their coöperating contacts.

Referring again to Fig. 3, there is electrically associated with the strip 11, constituting a part of the contact 5, the socket 12, while there is electrically associated with the strip 8, constituting part of the contact 7, the socket 13 which in the present case as illustrated is a duplicate of the socket 12. The sockets 12 and 13 are represented as equipped with threaded extensions 14 adapted to engage in threaded openings in the two strips 11 and 8 respectively. There may if desired, be interposed between the respective sockets and strips washers as 15. To connect conductors with a pair of contacts as 5 and 7, the following procedure may be adopted: If necessary the sockets 12 and 13 will be backed out the required distance after which the bared ends of the conductors will be bent about a threaded extension 14 and laid upon the strips 11 and 8 respectively between the washers 15 and said strips. After this the sockets or wire holding means 12 and 13 will be run in to firmly and substantially connect the conductors to the two strips in question.

In Figs. 4 and 5 I have shown a single coil, two wire meter 16 on a two wire system. In such an installation as this there are usually three pairs of contacts and the testing appliance 2 shown in Fig. 1 is usable in this connection. In Figs. 6 and 7 the meter 17 is a two coil, three wire meter on a three wire system. In the two coil three wire systems five pairs of contacts may be employed. With this arrangement I may as observed, employ one of the appliances 2 containing three pairs of contacts and two of the appliances 3 containing a single pair of contacts. These are merely, however, two of many illustrations. In the arrangement shown each current coil of the meter has contacts, with their associated means constantly conditioned to receive testing appurtenances, on its service and load sides. This is desirable where the appliance, when serving for testing purposes, provides for the bypassing around the meter coil. With other methods of testing, a single pair of contacts on one side of the coil may be used, the appliance of Fig. 2 serving this purpose. As shown there are also contacts connected in those legs of the circuit which do not contain meter coils. In the particular arrangements shown these are desirable, but may be dispensed with in others.

In Fig. 4 I have shown a two wire installation with its service and load wires and single current coil, two wire meter connected up under normal conditions with a meter testing appliance involving the invention. As here shown the appliance has three pairs of contacts with their associated means to receive testing appurtenances. Inasmuch as the appliance here shown is to function for both cut out and meter testing purposes, fuse plugs of the well-known Edison screw type are shown mounted and connecting across the respective pairs of contacts. That leg of the circuit containing the current coil of the meter is in the arrangement shown provided with two fuses, there being a fuse plug mounted in the pair of contacts on the service side of the coil and another fuse plug mounted in the pair of contacts on the load side. This double fusing results in improved protective advantages. However, it is not imperative in order that the appliance shown in Fig. 4 may function for both cut out and meter testing purposes to provide such double fusing. Consequently if desired, one or the other of the two fuse plugs just referred to may be omitted, and in its place there may be substituted an unfused connector in the form of a plug to be received in the appropriate contacts.

In Fig. 5 I have shown the installation of Fig. 4 conditioned for testing, the testing appurtenances coacting with the contacts being shown in place and the testing circuit with its standard meter and resistance being indicated by the heavy and light dotted lines. It will be noted that a by-pass generally indicated by 20 and shown in detail in Fig. 8 is utilized to by-pass across from the service to the load side of the current coil of the meter, the plug ends of the by-pass being seated in the necessary sockets associated with the contacts on each side of the current coil referred to. The by-pass consists of a flexible wire, each terminal of which is in the form of a split plug pin. After the by-pass has been positioned, the central connector, in the present case shown in the arrangement of Fig. 4, as a fuse plug, is removed, thus electrically freeing the load side terminal of the current coil. The ends of the main testing circuit are provided with split pin plug pieces as generally indicated by 21 and shown in detail in Fig. 9. One of these is plugged into the socket associated with the contact on the electrically freed load side of the current coil of the meter, while the other is plugged into the socket associated with a contact in the other leg of the circuit. By this connection the testing circuit is connected across from one side of the circuit through the standard meter and resistance to the load side end of the current coil of the installed meter and to the other side of the circuit. In this particular testing arrangement, current for the test is taken from the line. For the purpose of connecting the volt coil of the standard meter two additional plugs may be used like those indicated by 21, these being suitably placed in the proper sockets to connect the volt coil across the line. After the test has been made by passing the testing current through both the installed meter and the standard meter, then the parts may be restored to their normal condition as shown in Fig. 4. This is done by first replacing the connector serving on the load side of the current coil of the installed meter after which all of the testing plugs may be removed.

In Fig. 6 I have shown a three-wire installation with the three service and load wire and the three wire, two coil meter connected up under normal conditions with the meter testing appliances as shown in Figs. 1 and 2, this as shown and arranged in the three wire installation of Fig. 6 forming a complete sectional testing device, or as it may be called, appliance, for this particular three wire installation. As has already been made clear that instead of being of sectional character so far as concerns the mounting of the necessary contacts, all said contacts may be mounted upon a common base. For the sake of clearness in the description the connectors coacting with the different pairs of contacts have been omitted, but in actual practice each pair of contacts will be bridged across with a connector. In order that the appliance may serve its cut out function as well as its meter testing purpose, some of these connectors will be in the form of fuses which in order to coöperate with the contacts shown will be of the Edison screw plug type. It will be noted in connection with the showing of Fig. 6 that as has already been indicated in connection with the showing of Fig. 4 there is a pair of contacts provided on each side of each meter coil. Consequently if desired, there may be placed on both the load and service side a fused plug due to which arrangement that particular leg of the circuit would be doubly protected. However, as has already been explained in connection with Fig. 4, this is not imperative, because one of the connectors may be of unfused character, the other connector serving the protective purpose. It will also be observed that there is provided in the neutral or middle wire of the three-wire circuit a pair of contacts which are adapted to receive a plug which may be a fuse plug if it is desired to provide in that leg of the circuit such protection. As indicated diagrammatically in both Figs. 6 and 7 this pair of contacts with its associated means adapted to receive testing appurtenances does not enter into either the normal connections of the meter nor the testing connections. In such connection arrangements, therefore and where the neutral need not be fused, this central pair of contacts may be entirely omitted. Where such a pair of contacts with their testing appurtenance receiving parts is placed in the neutral leg of the circuit, provision is thus made for using the complete testing device or appliance in making other connections and tests than here shown.

As before the test shown in Fig. 7 is to be made with current supplied from the line and by using a standard meter and resistance placed in series with the installed meter. The testing appurtenances are of the same character as already described consisting of by-passes 20 and main testing circuit and potential testing circuit plug terminals 21. The test is to be made in a manner similar to that used in connection with the test of the single coiled meter installation, Figs. 4 and 5. As shown in Fig. 7 the parts and circuits of the installation of Fig. 6 have been conditioned for testing by the following procedure: There being two meter coils one in each outside leg of the three wire circuit, it is necessary, if the customer's service is to remain undisturbed, to by-pass around each coil before that coil becomes accessible for testing purposes. To accomplish this result a by-pass is plugged across from the service side to the load side of each coil as shown in Fig. 7. After this has been done the load side connectors on the load side end of each of the two coils are removed. This frees the load side terminal of each coil. The main testing circuit is now plugged across so as to connect from the load side terminal of one coil to the load side terminal of the other coil as shown, and when so connected current passes from one of the outside legs of the three-wire circuit through one of the current coils of the installed meter to the main testing circuit through the standard meter, resistance, to the load side terminal of the other current coil of the meter and to the other outside leg of the three wire circuit. The potential coil of the standard meter has its two terminals plugged across the two outside wires of the three wire circuit by using the terminals 21 which are shown placed in the proper position. As in the case of Fig. 5 the testing plugs and by-passes are shown positioned, while the testing circuit, standard meter and resistance are shown by the heavy and light dotted lines respectively.

I have here shown only two circuit and connection arrangements for testing purposes. It will be understood that there are many other methods of connecting up for testing purposes. The tests shown in connection with both the two wire and three wire installation are of a character in which current is taken from the line and the installed meter is tested with a resistance in series with it and the standard meter. There are other methods of making a test of the installed meter for which my testing appliance is equally well adapted.

From the foregoing description, it will be apparent that the invention comprises as to one of its important features a standard commercial fuse cut-out block. As will be evident this particular appurtenance may be any one of several styles or types, the invention not concerning this point. I have illustrated however that type of fuse standard commercial cut-out block which involves the use of a screw plug; this is merely illustrative although this particular form of appurtenance does have its advantages. In a simple and expeditious manner I can convert this standard commercial fuse cut-out block into a meter testing appurtenance, while at the same time permit it to also retain its normal functions. In this particular connection I might note that I have represented merely one of a large number of ways of effecting this conversion. By a standard commercial fuse cut-out block, I refer to such blocks no matter whether serving for one pole or a plurality of poles, and for main line or branch circuits, which are commonly used in the art and comprise a base with suitable fuse receiving and wire connecting contacts.

What I claim is:

1. The combination with the base and the fuse receiving and wire connecting contacts of a standard commercial fuse cut-out block, of means associated with said contacts to convert said block into a meter testing appurtenance.

2. The combination with the base and the fuse receiving and wire connecting contacts of a standard commercial fuse cut-out block, of means associated with said contacts to convert said block into a meter testing appurtenance while maintaining the normal cut-out function of said block.

3. The combination with a standard commercial fuse cut-out block comprising base and fuse receiving and wire connecting contacts for coöperation with a plurality of fuses, of means associated with the contacts of a plurality of fuses and their complemental wire connecting contacts, to convert said block into a meter testing appurtenance.

4. The combination with a plurality of standard commercial fuse receiving and wire connecting contacts and their support, each of said fuse receiving and wire connecting contacts being adapted for coöperation with a fuse and for connection independently in a circuit, one of said fuse receiving and wire connecting contacts being connectible on the service side and another of said fuse receiving and wire connecting contacts being connectible on the load side of a current coil of a meter and means associated with the fuse receiving and wire connecting contacts so connectible to adapt said appurtenance for meter testing.

5. The combination with a plurality of standard commercial fuse receiving and wire connecting contacts and their support, each of said fuse receiving and wire connecting contacts being adapted for coöperation with a fuse and for connection independently in a circuit, one of said fuse receiving and wire connecting contacts being connectible on the service side and another of said fuse receiving and wire connecting contacts being connectible on the load side of a current coil of a meter and means associated with the fuse receiving and wire connecting contacts so connectible to adapt said appurtenance for meter testing while maintaining in said appurtenance its cut-out function.

6. The combination with the screw plug fuse receiving contacts and suitable wire connecting means of a standard commercial fuse cut-out block, of means associated with said wire connecting means to convert said block into a meter testing appurtenance.

7. The combination with the base and the fuse receiving and wire connecting contacts, of a standard commercial fuse cut-out block, of means associated with said wire connecting contacts adapted to serve for clamping the wire to said contacts and formed to removably receive testing appurtenances to convert said cut-out block into a meter testing appurtenance.

8. The combination with the base and fuse receiving contacts and wire connections of a standard commercial fuse cut-out block, of means associated with said wire connections for clamping the wire and at the same time removably receiving a testing appurtenance.

9. The combination with the base and fuse receiving contacts and wire connections of a standard commercial fuse cut-out block, of means associated with said wire connections for clamping the wire and socketed to removably receive a testing appurtenance.

10. A cut-out block comprising a base, a shell constituting a contact, carried by said base, a central end contact in the shell, extensions from the shell and central end contact, respectively electrically connected therewith, and members in threaded connection with the respective extensions, for clamping conductors thereto, each of the members being socketed to receive testing means whereby said members serve dual functions as set forth.

11. A cut-out block comprising a base, a shell constituting a contact, carried by said base, a central end contact in the shell, extensions from the shell and central end contact, respectively electrically connected therewith, and members in threaded connection with the respective extensions, for clamping conductors thereto, each of the members having means to removably receive testing appurtenances.

In testimony whereof I affix my signature in presence of two witnesses.

JOSEPH SACHS.

Witnesses:
L. L. MARKEL,
HEATH SUTHERLAND.